Jan. 23, 1962     H. KLAESSIG ETAL     3,018,185

PROCESS FOR HEATING LIQUIDS

Filed Oct. 1, 1959

INVENTORS
HENRY KLAESSIG
JOHN R. PENNIE
FREDRICK E. CLAY
BY

ROBERT CALVERT
ATTORNEY.

United States Patent Office 3,018,185
Patented Jan. 23, 1962

3,018,185
PROCESS FOR HEATING LIQUIDS
Henry Klaessig, New Brunswick, N.J., John R. Pennie, Fort Scott, Kans., and Frederick E. Clay, Valhalla, N.Y., assignors to The Borden Company, New York, N.Y., a corporation of New Jersey
Filed Oct. 1, 1959, Ser. No. 843,845
1 Claim. (Cl. 99—216)

This invention relates to a process for sudden and eventual even heating of a liquid that is subject to deterioration on being overheated or overexposed to a necessarily elevated temperature.

The invention is particularly useful in the economical heating of milk that is to be subsequently evaporated, canned under non-aseptic conditions, and then sterilized, with minimum development of cooked flavor and discoloration.

The invention will be illustrated, therefore, particularly in connection with processing milk.

The invention comprises the process of introducing and then blasting with a steam jet incoming liquid to be heated, at a position adjacent to but below the upper surface of a supply of the same liquid that has been previously warmed, so that the incoming liquid is given a cyclonic movement and then quickly equalized in temperature with the said supply, and delivering the thus made and heated mixture, after a very short total processing time such as a second or more, through an outlet for subsequent conventional processing steps.

In one embodiment of the invention, the said incoming liquid is introduced in the form of fine streams, immediately below the surface of the said supply of liquid, the container is closed, and pressure is maintained on the liquid, the effect of the pressure being evident in the improved flavor and color of the product after the final evaporation, canning, and sterilization.

The invention will be further illustrated in connection with the attached drawings to which reference is made.

The figures are in part diagrammatic. Parts not shown and process steps not described in detail are conventional.

Figure 1:
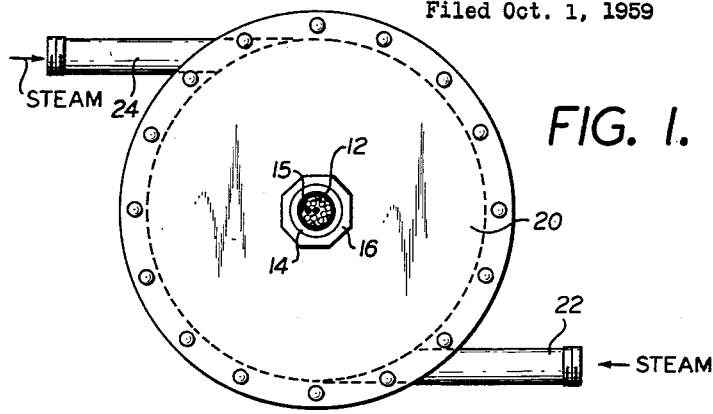
FIG. 1 is a plan view of the equipment for the controlled heating.
Figure 2:
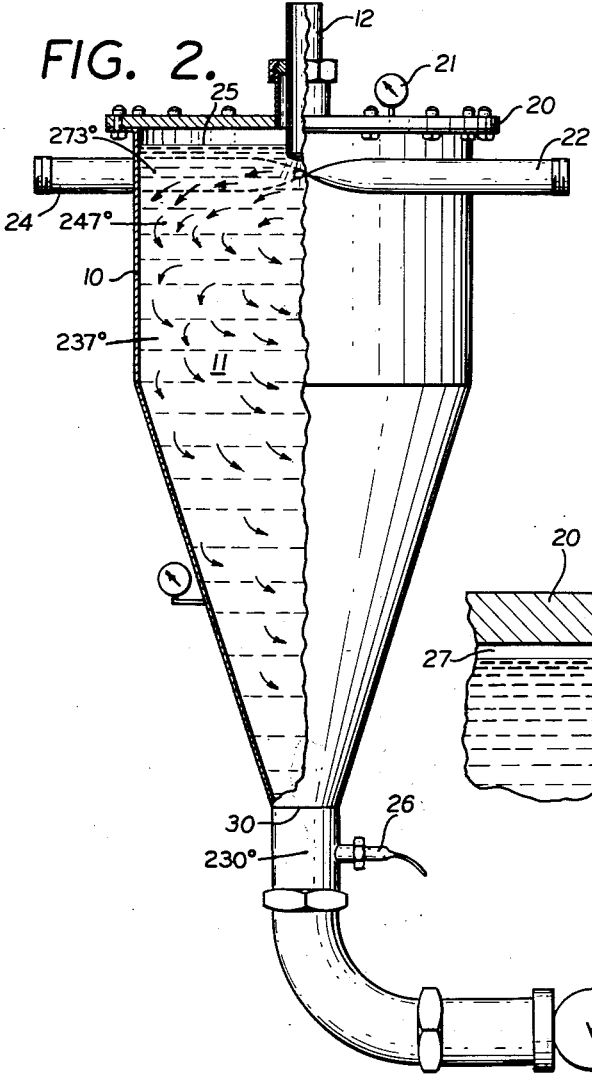
FIG. 2 is a side elevation, partly in section.
Figure 3:
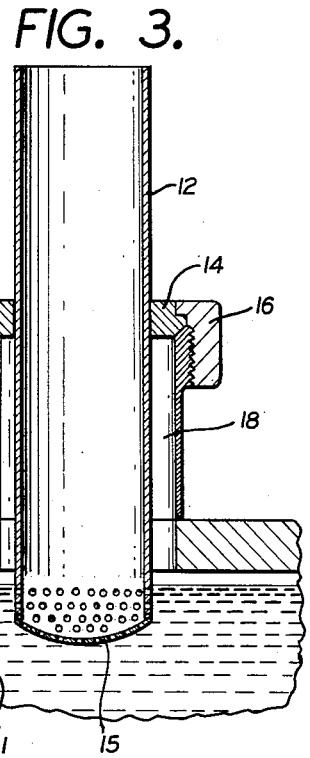
FIG. 3 is a similar view on an enlarged scale showing in greater detail the equipment for introducing the incoming liquid to be heated.

The degrees shown in FIG. 2 are the temperatures, in ° F., at various positions in the heater in a representative run.

There are shown vessel 10 for retaining a supply 11 of the previously warmed liquid as a continuous mass, inlet pipe 12 for the downward introduction of the liquid to be heated, the pipe being provided at its lower end with openings 15 for subdividing the incoming liquid, cap 14, nut 16, and ferrule 18 to make a pressure tight connection between the pipe 12 and the cover 20. The cover is held to the tank 10 by usual means and is provided with gauge 21 communicating with vapor space 27 below the cover and above the upper surface 25 of the liquid 11.

Steam lines 22 and 24 create steam jets entering tangentially with respect to the cross section of the vessel 10, i.e., in a zone generally transverse to the longer and vertical dimension of the said vessel, at positions adjacent to but below the upper level 25 of the continuous mass of liquid retained in the said vessel. Thus the nozzle outlets of the steam jets are about 1–6 inches below the said level, ordinarily 1–3 inches on centers, and at substantially the level of the lower end of line 12.

The vessel 10 is provided near its bottom with temperature control such as a Bourdon tube 26 operating in usual manner upon a valve (not shown) to the steam inlet lines 22 and 24, so as to control the pressure at which the steam is admitted.

The outlet line 30 from the bottom of the tank 10 delivers the heated liquid through a pressure release valve 32 set to maintain in the tank 10 the pressure generated by the steam jets 22 and 24 supplemented by the weight of the column of liquid between the level 25, and the valve 32.

The liquid so heated is ready for delivery through the line 34 to additional processing equipment of usual kind, as for concentration by evaporation, canning and sterilization.

In the operation of the equipment and process described, there is controlled heating to the substantially exact temperature desired, predominantly horizontal mixing of the liquid introduced through 12 and of the supply 11, with a minimum of up and down turbulence, and period of time during which the introduced liquid is maintained in contact with the supply of heated liquid 11 just long enough to insure thorough distribution of the newly introduced liquid and uniformity of temperature thereof with the said supply of liquid. This is effected within a few seconds time under the influence of the cyclonic action of the steam jet action. Actually, in heating milk, we use for best results only about 3–30 seconds between the introduction of the milk through line 12 and the final withdrawal of the mixture through outlet 30 from the lower part of the processing tank. The exact period of time required depends somewhat on the dimensions and shape of the vessel 10 and temperatures used. The times given are for a vessel of capacity of about 20 gallons and of the round, tapered shape down in the drawings, steam pressures of about 50 p.s.i. gage and maximum temperatures of about 250°–310° F. at the top of tank 10 and 275° F. at outlet 30. Longer times, up to about 2–5 minutes may be used at lower pressures of steam, giving lower temperatures.

The materials of construction are those that are commonly used in like parts for apparatus of this general type. In the heating of milk, the parts are all stainless steel, as required for the milk industry. For other liquids we use materials permissible therefor, non-corrosive under the conditions of use, and sufficiently strong to withstand any pressures that are to be used in the apparatus. With some liquids to be heated, the surfaces in contact with the liquid are tinned iron, enameled iron or steel, or glass.

As the liquid to be heated in our apparatus and process, milk is the one ordinarily used, whole milk being used when the product is to be evaporated milk. Other liquids that may be processed as described are skim milk for making evaporated skim milk, orange, grape, grapefruit, pineapple, and tomato juices or like natural liquids that are to retain as far as possible their natural flavor, color, or initial viscosity for a given degree of concentration.

As to conditions of operation in the preheating of milk, the milk is conveniently introduced warm and steam for further heating is injected, as through 22 and 24, at a pressure above that in vessel 10. The subdivided milk to be heated is pumped through the line 12 and delivered by the holes 15 about 0.5–6 inches below the level 25. The pressure is variable with the liquid being processed, as within the range about 15–100 p.s.i. but suitably is about 40–60 p.s.i. The temperature control 26 is so set that the steam injected maintains the desired temperature of the heated mixed liquid issuing through outlet 30. In heating milk, the temperature is maintained at about 200°–300° and in regular operation at about 220°–240° for the milk issuing through this outlet. The temperatures stated, reached quickly as they are, are adequate for processing the milk to be delivered to subsequent steps and does not disturb substantially the color or flavor.

The apparatus is low in initial cost and in steam consumption for a given capacity of processing.

A feature of the invention is the momentary heating of the subdivided liquid, introduced through line 12, to a temperature above that at which it is to be maintained after mixing with the supply of the liquid 11.

In the operation and process described representative temperatures were 160°–185° for the supply of milk 11 as introduced through pipe 12 just below the surface 25 under the vapor space 27 of depth about 1–3 inches. At various distances below this level and 3 inches in from the side wall of tank 10, the temperature readings were as follows:

| Distance Below Surface 25, inches | Temperature of Liquid 11, ° F. |
|---|---|
| 3 | 273 |
| 8 | 247 |
| 13 | 237 |
| 24 (near outlet 30) | 230 |

These readings show that the liquid is at the maximum temperature near the start of the heating, as within the first 10 seconds, and falls to a minimum for the mixing and holding period at the end of that period.

The cyclonic circulation of the liquid in whirling manner, with a minimum of up and down mixing, makes possible the temperature gradient found. As a result, there is progression in generally spiral manner of the liquid from the zone of highest temperature near the top of the tank downward through the tank and finally through the outlet 30. For a total time of a few seconds in the tank 10, the actual period during which the liquid is at the maximum temperature near the top of the charge is only about $\frac{1}{10}$–$\frac{1}{4}$ of the total time.

The invention will be further illustrated by description in connection with the following specific examples of the practice of it. In these Examples and elsewhere herein proportions are expressed as parts by weight, all temperatures as degrees F., and pressures as p.s.i. gauge.

*Example 1*

The tank 10 of 18 inches diameter, height about 2 feet and capacity about 20 gallons had walls $\frac{1}{8}$ inch thick, the bottom plate was $\frac{1}{16}$ inch thick, and 180 holes were drilled of diameter $\frac{3}{32}$ inch each on $\frac{1}{4}$ inch centers in the curved bottom end of the line 12 of 3 inches diameter projecting below the cover of the tank by about 3 inches.

Raw whole milk at about 36° was pumped through the apertured line 12 as fine streams 1–2 inches below the surface 25 of a prewarmed supply of milk in tank 10. The depth of the vapor space 27 varied from 0–1.5 inches. The inlet steam was at a temperature of 295°–300° and pressure of 51–52 pounds. The gauge 21 on the cover showed 42–45 p.s.i. The entire mixing and holding in tank 10 occupied 30 seconds and the outlet temperature of the mixed milk at position 30 was 214°–218°.

The milk was delivered through the outlet 30 and into line 34 to a conventional pan well, held there for 5–7 minutes, and then to vacuum concentrator for concentration at 121°–124°. It was withdrawn from the concentrator at 26.1% total solids, 7.9% of fat, and ratio of 2.3 parts of solids-not-fat to 1 of fat. It was then homogenized at 2200 pounds first stage and 800 pounds second stage pressure in a usual milk homogenizer.

The product was found to be of color and flavor closely resembling normal pasteurized fluid milk.

*Example 2*

The procedure of Example 1 is followed except that the raw whole milk, before delivery through line 12 is preheated to about 160° and held in usual manner to produce stabilization against thickening in the finished canned product. The inlet steam through lines 22 and 24 was at 298°, the temperature at the outlet 30 was 230°–233° F., and the total time during which the milk was in the tank 10, traveling from level 25 to the outlet 30, was 30 seconds. The product subsequently concentrated, canned and sterilized was of the good quality stated in Example 1.

*Example 3*

The procedure of Examples 1 or 2 is followed except that the milk delivered through line 12 to the heating apparatus and process of this invention is concentrated in advance to approximately 30%–40% solids. This means that the product issuing through outlet 30 is thus heated, preparatory to the next step, by the very economical and fast process described herein. Whether additional concentration is required subsequent to delivery through outlet 30 depends upon the concentration used initially and the concentration desired in the finished, canned product.

In a modification of this invention milk that has been concentrated to decrease shipping costs is mixed with raw milk and the mixture then heated as described in Example 1. The out flow through 34 is further concentrated in the conventional procedure preparatory to canning and sterilizing.

*Example 4*

The procedure of any of the Examples 1–3 is followed except that the milk used is skim milk.

In this case the heated skim milk issuing through outlet 30 is reconstituted with the fat normally associated in the whole milk and the reconstituted material is concentrated by evaporation (panned), canned, and sterilized as described above.

In another modification of this example the fat is reconstituted into the heated milk after the final concentration and just preceding the canning operation.

Also the skim milk, after the final concentrating and without any reconstitution with fat, may be canned as skim milk and sterilized.

*Example 5*

The procedure of any of the Examples 1–4 is followed except that the heated milk issuing through line 34 is mixed with a conventional stabilizer against the separation of salts from the milk. Stabilizers that we can use are any of those approved for canned milk, including disodium hydrogen phosphate and sodium citrate.

We do not require as large amounts of these stabilizers as used in conventional canning processes. In fact we can omit the stabilizers entirely, at certain seasons of the year and in certain milks. Suitable proportions of the stabilizer, when used by us, are about 4–6 ounces for 1,000 pounds of the concentrated milk ready to can. The full legal limit of 16 ounces per thousand pounds of the concentrate is not necessary in our process. In fact such an amount of the sodium phosphate stabilizer occasionally gives objectionable thinning of the milk and fat separation on aging.

*Example 6*

Concentrated orange juice for canning or freezing is substituted for milk as the liquid introduced through line 12 and also for the prewarmed supply 11, both in Example 1. Steam is introduced through jets 22 and 24 in amount to raise the orange juice to the specified temperature for sterilization of orange juice in the quick heating and short time of exposure described.

The shorter the time in tank 10 the higher must be the tempertaure of sterilization.

The product is then ready for aseptic canning.

In a modification of this invention, the raw orange juice is introduced through 12 and subjected to the heating for periods of time shown in Examples 1–3, preparatory to the delivery of the juice to the usual concentrating equipment. In this manner we obtain the benefit of our efficient and economical heating to replace the slower and somewhat more expensive warming up on drums or the like preparatory to the concentration of the orange juice commercially. Also the sudden short heating to very high temperatures, at the beginning of the mixing of raw juice with the supply of juice in tank 10, inactivate the enzymes which, if allowed to remain active, increase the development of off-flavor and undesired products in the orange juice during storage and shipment.

*Example 7*

The procedure of Example 6 is followed except that the orange juice is replaced by any of the other juices disclosed herein.

It will be understood that it is intended to cover all changes and modifications of the examples of the invention herein chosen for the purpose of illustration which do not constitute departures from the spirit and scope of the invention.

We claim:

In preheating milk that is to be subsequently concentrated by evaporation, the process which comprises introducing, in subdivided form and downwardly, warmed liquid milk to be further heated at a position adjacent to and below the upper surface of a heated continuous mass of liquid milk, injecting pressure steam substantially horizontally and generally tangentially within the said heated mass adjacent to the said position, so as to produce a cyclonic action that is largely horizontal and to heat the resulting mixture, continuing the introduction of the subdivided milk and injection of the steam, and withdrawing the heated mixture from the lower part of the mass at a rate approximately equal to the rate of introduction of the said subdivided milk.

References Cited in the file of this patent

UNITED STATES PATENTS

| | | |
|---|---|---|
| 2,401,077 | Johnston | May 28, 1946 |
| 2,452,260 | Peebles | Oct. 26, 1948 |